US008908354B2

(12) United States Patent
Bald et al.

(10) Patent No.: US 8,908,354 B2
(45) Date of Patent: Dec. 9, 2014

(54) ELECTRICAL INSTRUMENT HAVING CONFIGURABLE INPUT TERMINAL BLOCK

(75) Inventors: Roger Bald, Round Lake, IL (US); Ya Ho Hsieh, Keelung (TW); Chun-Pin Chiang, New Taipei (TW)

(73) Assignee: Associated Research Technologies, Inc., Diamond Bar, CA (US)

( * ) Notice: Subject to any disclaimer, the term of this patent is extended or adjusted under 35 U.S.C. 154(b) by 223 days.

(21) Appl. No.: 13/548,408

(22) Filed: Jul. 13, 2012

(65) Prior Publication Data

US 2014/0014411 A1 Jan. 16, 2014

(51) Int. Cl.
*H02B 5/00* (2006.01)

(52) U.S. Cl.
USPC ............ 361/621; 361/611; 361/624; 361/637

(58) Field of Classification Search
USPC .................. 361/611, 621, 624, 632, 637, 648
See application file for complete search history.

(56) References Cited

U.S. PATENT DOCUMENTS

| | | | | | |
|---|---|---|---|---|---|
| 2,619,621 | A | | 11/1952 | Brown | |
| 2,785,324 | A | | 3/1957 | Manney et al. | |
| 4,001,804 | A | * | 1/1977 | Irving | 340/650 |
| 4,356,440 | A | | 10/1982 | Curtiss et al. | |
| 5,007,156 | A | | 4/1991 | Hurtgen | |
| 5,675,194 | A | * | 10/1997 | Domigan | 307/147 |
| 5,875,087 | A | * | 2/1999 | Spencer et al. | 361/87 |
| 5,995,394 | A | * | 11/1999 | Svensson et al. | 363/51 |
| 6,054,865 | A | * | 4/2000 | Bald et al. | 324/551 |
| 6,630,804 | B2 | * | 10/2003 | Moriya et al. | 318/85 |
| 2003/0197989 | A1 | * | 10/2003 | Nojima | 361/47 |
| 2004/0017120 | A1 | | 1/2004 | Lyle et al. | |
| 2005/0201029 | A1 | * | 9/2005 | Xu | 361/76 |
| 2008/0247105 | A1 | * | 10/2008 | Divan | 361/56 |
| 2011/0080692 | A1 | | 4/2011 | Yu | |
| 2011/0080693 | A1 | * | 4/2011 | Tsai et al. | 361/634 |

* cited by examiner

*Primary Examiner* — Courtney Smith
(74) *Attorney, Agent, or Firm* — Bacon & Thomas, PLLC

(57) ABSTRACT

An electrical instrument includes an input terminal block that allows customers to configure input power as either single-phase, three-phase delta, or three-phase wye, using shorting bars to connect appropriate line and/or neutral terminals to each other without the need for an external adaptor or converter, and without modifying the internal circuitry or programming of the instrument.

4 Claims, 3 Drawing Sheets

ELECTRICAL INSTRUMENT HAVING CONFIGURABLE INPUT TERMINAL BLOCK

BACKGROUND OF THE INVENTION

1. Field of the Invention

The present invention relates to an electrical instrument, and in particular to an electrical instrument such as an AC power source having an input terminal block that allows customers to configure input power as either single phase, three phase delta, or three phase wye, without the need for an external adaptor or converter, and without modifying the internal circuitry or programming of the instrument or power source.

2. Description of Related Art

The present invention provides an improvement over the power input illustrated in FIGS. 3 and 4 of U.S. Patent Publication No. 2011/0080692, in which single phase and three phase wye and delta input connections are configured by connecting different "wiring blocks" 13 (in the form of multiple input/multiple output trace patterns shown in FIGS. 6-8) between two fixed terminal blocks T2,T3, the first of which (T1) includes three line terminals and a neutral terminal, and the second of which (T2) includes six terminals connectable to either the line or neutral terminals depending on the desired input configuration.

The power input arrangement of U.S. Publication No. 2011/0080692 has the disadvantage that, in order to change the configuration of the power input, it is necessary to replace the entire distribution circuit with another distribution circuit having a different trace pattern. This arrangement is both expensive and subject to operator error since it is possible to confuse the trace patterns and inadvertently misconnect the respective line and neutral terminals of the two fixed terminal blocks.

In contrast, instead of configuring the power input by using two fixed terminal blocks connected together by a configurable wiring blocks, a three-phase power input embodiment of the present invention utilizes a single terminal block having three line and three neutral terminals directly connectable to wires of an input power cable, with configuration being accomplished by attaching shorting bars to connect together the three line terminals or the three neutral terminals, or respective line and neutral terminals, to achieve the desired input configurations. According to the invention, there is no need to select from among multiple similarly-appearing pre-wired wiring blocks, as in U.S. Publication No. 2011/0080693, or to use an external adapter or converter. Furthermore, the invention may be adapted for additional phases by expanding the single terminal block to include additional line and neutral terminals so that the total number of line terminals and the total number of neutral terminals each equals the maximum number of input phases, and by providing appropriately dimensioned shorting bars for connecting together the line and neutral terminals according to the desired wiring configuration.

In an exemplary embodiment, the terminal block of the invention is applied to an AC power source. AC power sources are electrical instruments that convert an AC voltage and/or frequency level into another AC voltage or frequency level. For example, the AC power source may be used to convert a single phase line voltage input into a single or multiple phase electrical test voltage, to provide enhanced metering and current protection capabilities, to condition the output power to minimize power factor related losses, or to simulate voltage surges and drops during transient testing.

In typical AC power sources used for electrical testing, or to supply power for other electrical instruments, the power input is through an input terminal block having a neutral (N) screw terminal, a line (L) screw terminal, and a ground (G) connection, and is designed to accept typical line or mains voltages of between 180-284 VAC at frequencies of 47-63 Hz. Examples of AC power sources with fixed input terminal block configurations include modular AC power source model nos. 310XAC, 320XAC, and 340XAC, sold by Associated Power Technologies, Inc., of Diamond Bar, Calif. Such input power connections are simple and reliable but can only be directly connected to a single phase AC line voltage. As a result, the problem arises that when the only available external power source is a multiple phase external power source, an adapter or converter must be provided to convert the multiple phase input power into single phase input power for input through the included single phase terminal block.

The present invention provides an improvement to the single input block of the conventional power source, which allows direct connection to three phase input power supplies as well as single phase power supplies, without the need to modify the internal input circuitry or programming of the power source, without the need for an external adapter or power converter, and without the need for the multiple terminal blocks and connecting "wiring blocks" described in the above-cited U.S. Patent Publication No. 2011/0080693. While it may be used in the Associated Power Technologies™ AC power sources mentioned above, it is not limited to any particular AC power source, or even to AC power sources in general. In addition, the input terminal block of the invention may be applied to converters having a DC output, which are not strictly "AC power sources," as well as to any power conditioner, controller, protection device or other electrical instrument having an AC input(s), including multiple function, programmable, or modular devices.

Finally, by way of general background, it has long been known to provide terminal blocks to facilitate connections between different circuits. Examples of terminals blocks in contexts other than the electrical instrument input of the present invention include the terminal block of U.S. Pat. No. 5,007,156, which is used to connect the windings of a three-phase electrical motor in either wye or delta configurations, or the terminal blocks of U.S. Pat. No. 2,785,324 and U.S. Patent Publication No. 2004/0017120, which enable switching between high and low voltage configurations by changing the interconnections between terminals of the terminal block. The present invention differs from these terminal blocks both in the specific configuration of the terminals, and in that it is applied to the particular context of providing a configurable input for an instrument, so as to enable the instrument to receive both single and multiple phase input power with different wiring configurations.

SUMMARY OF THE INVENTION

It is accordingly an objective of the invention to provide a simplified configurable input power arrangement for an electrical instrument having an input power terminal block that enables configuration of the input power as either single phase or multiple phase input power without the need for an external adaptor or converter.

It is also an objective of the invention to provide a configurable input power terminal block, in which configuration is achieved by using at least one shorting bar to appropriately interconnect the line terminals, the neutral terminals, or respective line and neutral terminals.

These objectives are achieved, in accordance with the principles of a preferred embodiment of the invention, by providing an electrical test instrument having an input terminal block that is capable of being configured to have anywhere from one to N input phases, wherein N is at least three, the input terminal block including at least two sets of N input terminals and an additional ground terminal.

The invention provides an improvement over the input power arrangement disclosed in U.S. Patent Publication No. 2011/0080693, in which configuration is achieved by connecting one of a plurality of pre-wired "wiring blocks" connecting two fixed input terminals, the first of which is a four terminal line input and the second of which is a six terminal configurable output. Instead, of pre-wired "wiring blocks" between multiple fixed terminals, the invention provides a single terminal block, each terminal of which is directly connectable to wires of an input power cable, and which are configurable through the use of shorting bars to connect appropriate sets of terminals to each other to achieve the desired input wiring configuration.

In an exemplary embodiment of the invention, the maximum number N of input phases is three, and the individual terminals may be connected in either three-phase wye or three-phase delta configurations. Although the invention is not limited to a particular type of terminal, the terminals may be in the form of screw terminals. Alternatively, the terminal block of the preferred embodiment may include plug-in terminals, clip-on terminals, or any other type of terminal to which individual wires of an input power cable or line may be connected.

The term "input terminal block" is intended to encompass any structure having multiple terminals arranged to be connected to input circuitry of an electrical instrument, and is not limited to a single integral or discrete member, but may also include, by way of example, a set of terminals extending from an electrical instrument. The internal circuitry to which the terminals are connected forms no part of the present invention, and may include voltage/frequency conversion circuitry, power conditioning circuitry, control circuitry, and/or power monitoring/sensing circuitry. The electrical instrument in which the input terminal block of the invention is included is also not limited to a particular type of electrical instrument, but rather may include AC test instruments, AC and DC power sources, and other electrical devices having an AC input.

DETAILED DESCRIPTION OF THE PREFERRED EMBODIMENTS

Figure 1:
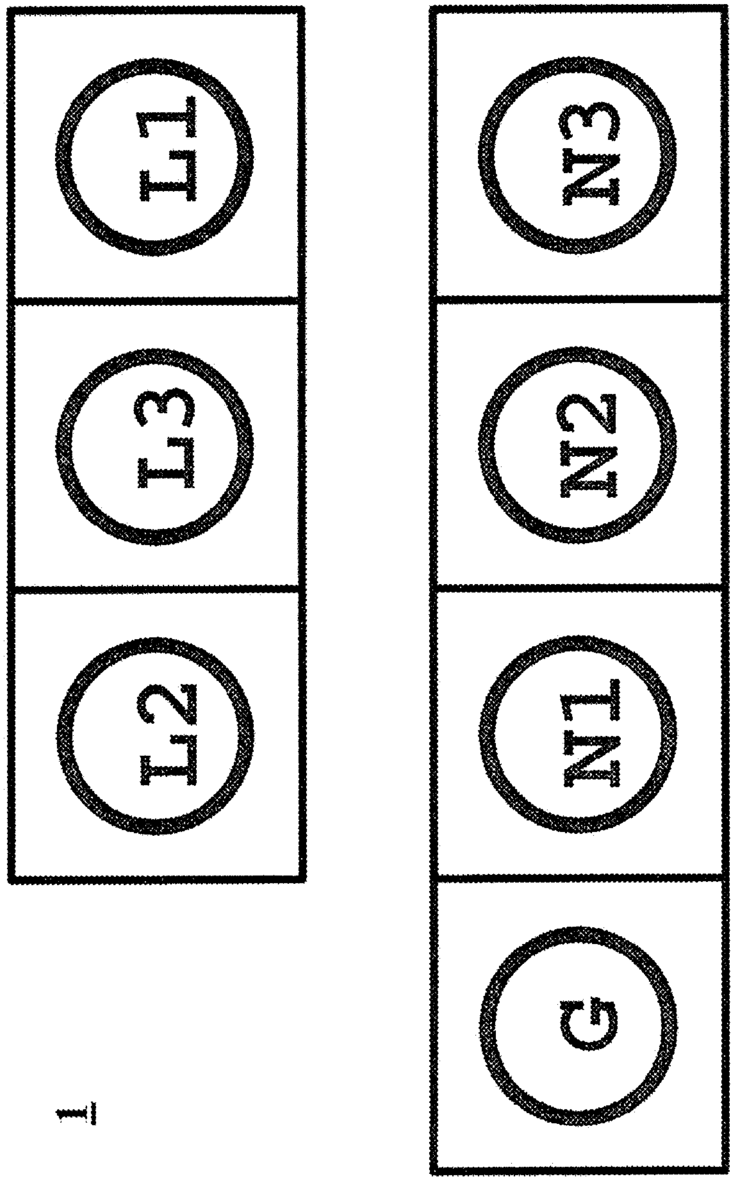
FIG. 1 is a schematic diagram showing the layout of an input terminal block constructed in accordance with the principles of a preferred embodiment of the invention.

FIG. 1 shows the layout of a terminal block 1 constructed in accordance with the principles of a preferred embodiment of the invention.

Figure 4:
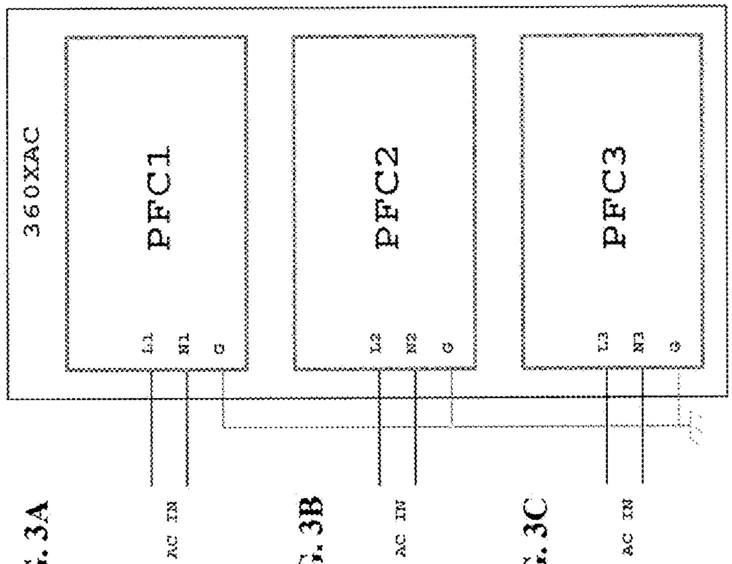
FIG. 4 is a schematic diagram showing respective connections between the terminal block of FIGS. 3A-3C and electrical test instrument input circuitry.

Terminal block 1 includes one earth terminal G, and two sets (L1,L2,L3) and (N1,N2,N3) of three terminals for connection to respective line and neutral wire of a three-wire or four-wire input cable. The specific connections of the terminals to the respective wires of the input cable are shown in FIGS. 2A-2C and 3A-3C, while internal connections to the terminals are shown in FIG. 4.

It will be appreciated that terminals G, L1-L3, and N1-N3, may be screw terminals, plug-in terminals, quick-connect terminals and any other terminals to which the wires of the input cable may be connected. The structure of the individual terminals forms no part of the present invention and may be freely varied. In addition, terminal block 1 refers to the group of terminals and their arrangement, and not to a particular physical structure for supporting the terminals. The terminals may, by way of example and not limitation, be arranged in a single support structure, multiple support structures, or simply extend from an appropriately configured panel or other structure of an electrical instrument. In addition, the terminals may be arranged in any number of rows, or in arrangements other than rows.

Figure 3A:
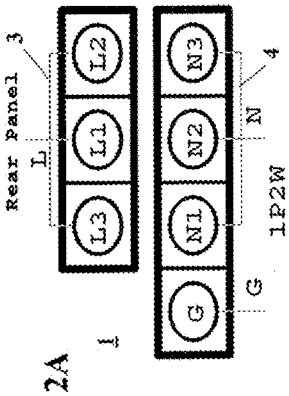
FIGS. 3A-3C show connections corresponding to the single and three phase equivalent circuits of FIGS. 2A-2C for the input terminal block of FIG. 1.
Figure 3B:
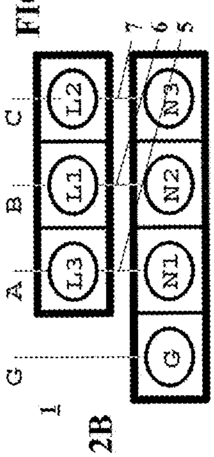
Figure 3C:
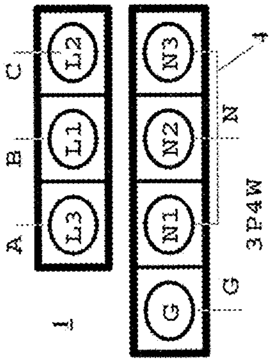

The respective single phase and three phase input power connections are achieved by connecting the line wire L (single phase) or line wires A-C (three phase) and neutral wire N (if present) of the input cable in the manner shown in FIGS. 2A-2C and 3A-3C, and by adding shorting bars or members 3-7 as shown in FIGS. 3A and 3C. Wires L, A-C, and N may be connected directly to the terminals or, alternatively, to an appropriately shaped terminal structure on the sorting bar itself, such as common screw terminal, or any other suitable connection arrangement.

The shorting bars or members 3-7 may take a variety of forms, including bars, rods, wires, or any other member capable of being electrically coupled to each of the terminals in a respective set (L1-L3) and/or (N1-N3), preferably by a clamp, screw, press fit, or other secure connection. The ground terminal G is connected to the ground or earth wire of the cable or the cable shield, depending on the type of cable.

Figure 2A:
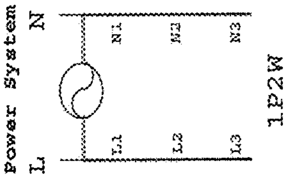
FIGS. 2A-2C are schematic circuit diagrams showing electrical equivalents of single and three phase connections for the terminal block of FIG. 1.

FIGS. 2A and 3A show a single phase connection in which the line wire L is connected to one of terminals L1-L3, and a first shorting bar or member 3 couples the terminal connected to wire L with the remaining terminals in the set L1-L3. In addition, a second shorting bar or member 4 connects neutral terminals N1-N3 while neutral wire N is connected to one of the terminals N1-N3 or to the second shorting bar or member 4.

Figure 2B:
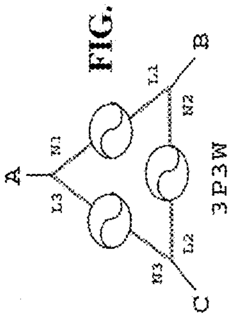

FIGS. 2B and 3B show a three phase, three wire "delta" input configuration in which wires A-C are respectively connected to terminals L1-L3, and terminals L1-L3 are connected by shorting bars, members, or jumpers 5-7 to respective terminals N2, N3, and N1. To facilitate the cross connections (terminal L1 to N2, L2 to N3, and L3 to N1), terminals L1-L3 are actually arranged in the order L3, L2, and L1, while terminals N1-N3 are arranged in numerical order. Of course, terminals L1-L3 could also be in the numerical order as terminals N1-N3, with appropriately configured jumpers, or terminals L1-L3 could be in numerical order with terminals N1-N3 being arranged in a different order.

Figure 2C:
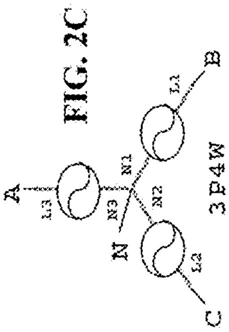

Finally, as shown in FIGS. 2C and 3C, wires A, B, and C may again be respectively connected to individual terminals L1-L3 while the neutral terminals N1-N3 are connected by shorting bar or member 4 (which may be the same as shown in FIG. 3A), and a neutral wire N of the three phase cable is connected to one of the neutral terminals or the shorting bar or member to form a three phase "wye" connection.

The opposite ends of the terminals are connected to internal circuitry of the electrical instrument, which in FIG. 4 is illustrated by way of example and not limitation as three power factor controller boards PFC1,PFC2,PFC3 of an AC power supply 360XAC. Each of the boards has a line input and neutral input corresponding to a respective one of the line terminals L1-L3 and neutral terminals N1-N3, as well as a separate connection to ground.

Figure 5:
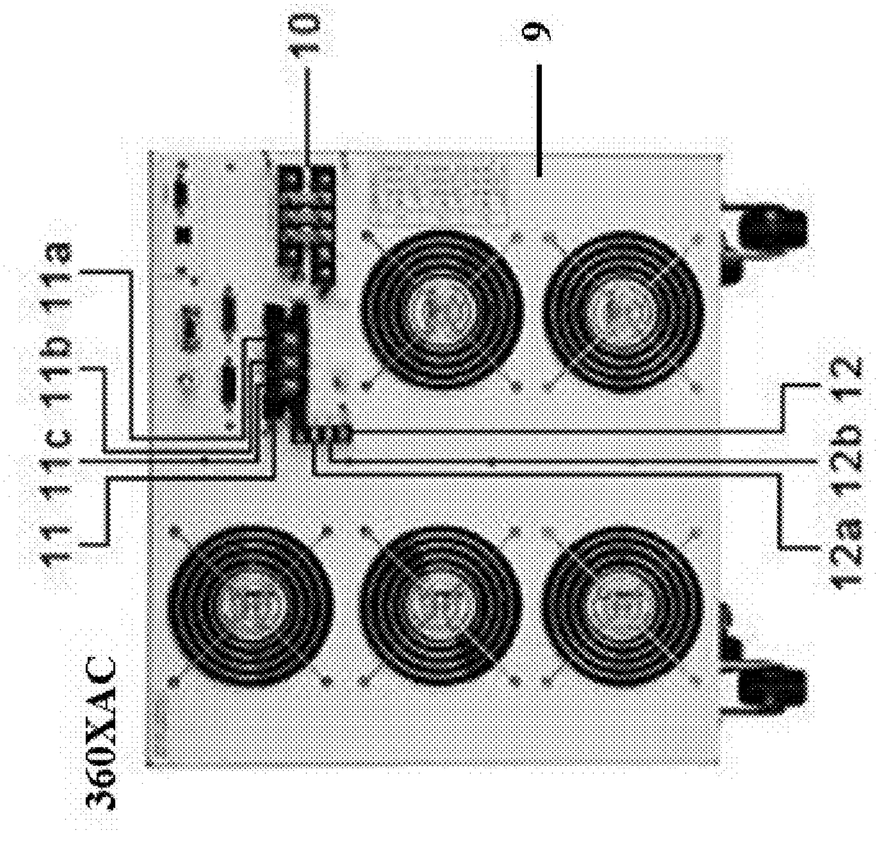
FIG. 5 is a rear elevation of an electrical test instrument that includes a terminal block corresponding to the terminal block of FIG. 1.

FIG. 5 shows a portion of a rear panel 9 of AC power supply 360XAC of FIG. 4, which includes a power input terminal block 10 corresponding to terminal block of FIG. 1 and FIGS. 3A-3C, as well as a power output terminal block 11 having conventional line, neutral, and ground screw terminals 11*a*-11*c*, and an external sense output terminal block 12 having line and neutral voltage sense screw terminals 12*a* and 12*b*. It will be appreciate that the layout of the input and sense terminal blocks, and of other components of the rear panel, may be entirely conventional and forms no part of the invention. The input terminal block 10 does not need to be on the rear panel of the instrument, or even on the exterior of the instrument, but may be situated at any convenient location.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. An electrical instrument having an input terminal block connectable in single phase and multiple phase configurations, comprising:

a plurality of line terminals;

a plurality of neutral terminals; and a ground terminal, wherein the number of line terminals equals the number of neutral terminals, each of which equals a maximum number of phases to which the input block is arranged to be connected, and wherein shorting bars are connectable between said line terminals, between said neutral terminals, and between said line terminals and said neutral terminals, respectively, to provide said single phase and multiple phase configurations, and wherein opposite ends of said line terminals and neutral terminals are respectively connected as pairs of line and neutral inputs to different internal circuits of said electrical instrument.

2. An electrical test instrument as claimed in claim 1, wherein said maximum number of phases is three, and said terminal block is connectable in single phase, three phase wye, and three phase delta configurations by, respectively:

connecting a first of said shorting bars to each of three line terminals and a second of said shorting bars to each of three neutral terminals, connecting the line wire of an input cable to the one of the line terminals or to the first shorting bar and connecting the neutral wire of the input cable to one of the neutral terminals or to the second shorting bar to obtain a single phase input configuration;

connecting three line wires of the input cable to respective individual line terminals, and connecting the respective individual line terminals to individual neutral terminals by respective first, second, and third said shorting bars to form three connected line-neutral pairs in a three wire delta configuration; and connecting three line wires of the input cable to respective individual line terminals, connecting the neutral terminals to each other by one of said shorting bars, and connecting the neutral wire of the input cable to said one of said shorting bars or to one of the neutral terminals, to form three line connections and one neutral connection of a four wire wye configuration; and wherein opposite ends of the line and neutral terminals are connected in line-neutral pairs to individual circuits of the electrical instrument.

3. An electrical test instrument as claimed in claim 2, wherein said individual circuits are power factor controller circuits of an AC power source.

4. An electrical test instrument as claimed in claim 1, wherein said terminals are screw terminals.

* * * * *